(12) United States Patent
Rath et al.

(10) Patent No.: US 7,745,554 B2
(45) Date of Patent: Jun. 29, 2010

(54) METHOD FOR PRODUCING A POLYISOBUTENE

(75) Inventors: Hans Peter Rath, Gruenstadt (DE); Helmut Mach, Heidelberg (DE); Thomas Wettling, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 38 days.

(21) Appl. No.: 12/089,930

(22) PCT Filed: Oct. 13, 2006

(86) PCT No.: PCT/EP2006/067379

§ 371 (c)(1),
(2), (4) Date: Apr. 11, 2008

(87) PCT Pub. No.: WO2007/042565

PCT Pub. Date: Apr. 19, 2007

(65) Prior Publication Data

US 2008/0249268 A1   Oct. 9, 2008

(30) Foreign Application Priority Data

Oct. 14, 2005 (DE) .................. 10 2005 049 236

(51) Int. Cl.
*C08F 4/14* (2006.01)
*C08F 10/10* (2006.01)

(52) U.S. Cl. .................. 526/237; 526/209; 526/135; 526/131; 526/348.7

(58) Field of Classification Search .................. 526/237, 526/209, 348.7, 211, 213
See application file for complete search history.

(56) References Cited

U.S. PATENT DOCUMENTS

| | | | | |
|---|---|---|---|---|
| 2,559,062 | A * | 7/1951 | Dornte | 526/172 |
| 5,166,286 | A * | 11/1992 | Bender et al. | 526/348.7 |
| 6,268,446 | B1 * | 7/2001 | Puskas | 526/142 |
| 6,642,329 | B1 * | 11/2003 | Rath | 526/237 |

FOREIGN PATENT DOCUMENTS

| | | |
|---|---|---|
| DE | 103 61 638 | 8/2005 |
| EP | 0 363 706 | 4/1990 |
| EP | 1 081 165 | 3/2001 |
| WO | 99 29744 | 6/1999 |
| WO | WO 2004/029099 A1 * | 4/2004 |
| WO | WO 2004/065432 A1 * | 8/2004 |
| WO | 2005 066220 | 7/2005 |

OTHER PUBLICATIONS

Vinnik, M. I. et al., "Catalytic Properties of Complex Compounds of Boron Fluoride". No. 10, pp. 285-290, XP002410342, 1960.
U.S. Appl. No. 12/598,934, filed Nov. 5, 2009, Tishkov et al.

* cited by examiner

*Primary Examiner*—David Wu
*Assistant Examiner*—Rip A. Lee
(74) *Attorney, Agent, or Firm*—Oblon, Spivak, McClelland, Maier & Neustadt, L.L.P.

(57) ABSTRACT

The invention relates to a process for preparing polyisobutene having a mean molecular weight $M_n$ of from 400 to 50 000, in particular from 500 to 10 000, by polymerizing isobutene in the presence of a $BF_3$-containing complex catalyst, wherein the polymerization is carried out at least temporarily in the presence of one or more cyclic ethers.

20 Claims, No Drawings

METHOD FOR PRODUCING A POLYISOBUTENE

This application is a 371 of PCT/EP2006/067379, filed Oct. 13, 2006.

The invention relates to a process for preparing polyisobutene using a cyclic ether.

Polyisobutene is prepared by polymerization of isobutene with $BF_3$-containing catalysts. Especially in the case of preparation of low and medium molecular weight polyisobutene, complexes of $BF_3$ with compounds which have active hydrogen atoms, for example alcohols, are used. The use of such complexes leads to side reactions with formation of tertiary fluorides such as tert-butyl fluoride, and hydrogen fluoride. When the polymerization is carried out in the presence of n-butenes (use of raffinate I or $C_4$ cuts from FCC), there is also the formation of secondary organic fluorides. The fluoride by-products firstly contaminate the polyisobutene. Secondly, they have different thermal stability and additionally release, depending on the stability, hydrogen fluoride in the course of degassing, storage or later functionalization of the polyisobutene. The hydrogen fluoride leads, especially in the presence of water, to high corrosion on the machines and apparatus used. This forces the use of machines and apparatus made of expensive, corrosion-resistant materials.

EP-A 1 081 165 describes a means of reducing the halogen content of polyisobutene by treating it with alumina under conditions which substantially prevent double bond isomerization. The treatment is effected, for example, over a fixed alumina bed. It is postulated that a cleavage of the halogenated polyisobutene molecules occurs on the alumina surface with reformation of vinylidene groups. Since this reaction is thermodynamically disfavored, it will presumably only take place to a slight extent and the initially observed low fluoride values are presumably attributable instead to adsorption of free fluoride on the alumina.

WO 2005/066220 describes a process for preparing polyisobutene, in which isobutene is polymerized in the presence of a halogen-containing Lewis acid as a catalyst, the catalyst is removed and/or deactivated, and the resulting polyisobutene is contacted with a zeolite of average pore size.

A further process for preparing low-fluoride polyisobutene is described in WO 2005/066222, in which the polymerization of isobutene is carried out with a $BF_3$-containing catalyst in the presence of a moderator which is selected from hydrogen cyanide, cyanides and nitriles.

WO 99/29744 describes the use of epoxides as initiators in the living cationic polymerization of olefins such as isobutene or vinylaromatics such as styrene. In this way, OH-terminated polymers are obtained.

It is an object of the present invention to provide a process for preparing polyisobutene, in which the formation of the fluoride by-products, preferably actually within the reactor, can be prevented or at least reduced. The process should lead in particular to polyisobutenes having a high content of olefinic end groups.

It has now been found that, surprisingly, this object is achieved when the polymerization of isobutene is carried out using boron trifluoride-containing complex catalysts, at least temporarily in the presence of a cyclic ether.

The invention thus relates to a process for preparing polyisobutene having a number-average molecular weight $M_n$ of from 400 to 50 000, in particular from 500 to 10 000, by polymerizing isobutene in the presence of a $BF_3$-containing complex catalyst, wherein the polymerization is carried out at least temporarily in the presence of one or more cyclic ethers.

The process according to the invention is preferentially suitable for the preparation of polyisobutene having a content of methylidene groups of more than 50 mol % and in particular of at least 60 mol %. In the context of the present application, methylidene groups are understood to mean those double bonds whose position in the polyisobutene macromolecule is described by the general formula

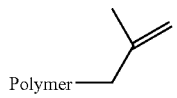

where "Polymer" represents the polyisobutene radical shortened by one isobutene unit. The methylidene groups exhibit the highest reactivity, whereas the double bonds lying further toward the center of the macromolecules, depending on their position in the macromolecule, exhibit only low reactivity, if any, in functionalization reactions. The expression "content of methylidene groups" relates to the percentage of polyisobutene molecules with methylidene groups based on the number of all olefinically unsaturated polyisobutene molecules in a sample. It can be determined by $^1H$ NMR and/or $^{13}C$ NMR spectroscopy, as is familiar to those skilled in the art. The content of methylidene groups is preferably at least 60 mol %, more preferably at least 75 mol %.

The polyisobutene obtained by the process according to the invention has a number-average molecular weight $M_n$ of from 400 to 50 000, preferably from 500 to 10 000, in particular from 600 to 5000, especially from 700 to 2500. The polydispersity D ($D=M_w/M_n$; $M_w$=weight-average molecular weight, $M_n$=number-average molecular weight) is typically less than 2.5, preferably less than 2.0 and in particular not more than 1.8.

Suitable feedstocks for the process according to the invention are both isobutene itself and isobutenic $C_4$ hydrocarbon streams, for example $C_4$ raffinates, $C_4$ cuts from isobutane dehydrogenation, $C_4$ cuts from steamcrackers, FCC crackers (Fluid Catalytic Cracking), which have generally been substantially freed of 1,3-butadiene present therein. $C_4$ hydrocarbon streams suitable in accordance with the invention comprise generally less than 1000 ppm, preferably less than 200 ppm of butadiene. Typically, the concentration of 1-butene, cis- and trans-2-butene in the $C_4$ hydrocarbon streams is in the range from 40 to 60% by weight. The concentration of isobutene is typically in the range from 20 to 50% by weight. The remaining amount of $C_4$ hydrocarbons (up to 40% by weight) are $C_4$-alkanes, i.e. n-butane and isobutane (total concentration of 1-butene, cis- and trans-2-butene). Such $C_4$ hydrocarbon streams are preferred starting materials for the process according to the invention. When $C_4$ cuts are used as the starting material, the hydrocarbons other than isobutene assume the role of an inert diluent.

Owing to the high viscosity of the polyisobutenes, the polymerization is effected in the presence of a diluent. Suitable diluents or diluent mixtures for the process according to the invention are those which are inert toward the reagents used. Suitable diluents are saturated or unsaturated, aliphatic, cycloaliphatic and aromatic hydrocarbons, for example saturated hydrocarbons such as butane, pentane, hexane, heptane, octane, for example n-hexane, i-octane, cyclopentane, cyclohexane, methylcyclohexane, toluene or ethylbenzene; halogenated hydrocarbons such as methyl chloride, dichloromethane or trichloromethane, and also mixtures of the aforementioned compounds. Preferred diluents are halogen-free hydrocarbons. The diluent used may also be isobutene itself when the polymerization is performed only up to a partial conversion. Before they are used in the process according to the invention, the diluents are preferably freed of impurities such as water, alcohols, aldehydes, ketones, carboxylic acids, nitrogen compounds or mineral acids, for example by adsorption on solid adsorbents such as activated carbon, molecular sieves or ion exchangers.

The catalysts used are boron trifluoride-containing complex catalysts. These are understood to mean catalysts composed of boron trifluoride and at least one cocatalyst, and are generally compounds which have an abstractable hydrogen atom (protic cocatalysts) and aprotic oxygen compounds which are selected from acyclic ethers, ketones, aldehydes and anhydrides of carboxylic acids. The protic cocatalysts include oxygen compounds with OH groups, such as water, primary $C_1$-$C_{20}$-alkanols, secondary $C_3$-$C_{20}$-alkanols, phenol, alkyl-substituted phenols such as cresols, aliphatic carboxylic acids and the like, but also halohydrocarbons such as dichloromethane or trichloromethane. Preferred protic cocatalysts are primary $C_1$-$C_{20}$-alkanols and secondary $C_3$-$C_{20}$-alkanols. The aprotic oxygen compounds include especially acyclic ethers and cyclic anhydrides of aliphatic dicarboxylic acids, preference being given to the former. Preferred cocatalysts are protic cocatalysts and mixtures of protic cocatalysts with aprotic cocatalysts. The molar ratio of cocatalyst to boron trifluoride is typically in the range from 0.5:1 to 3.0:1, frequently from 0.7:1 to 3.0:1, in particular in the range from 0.9:1 to 2.5:1 and especially in the range from 1.0:1 to 2.1:1.

The cocatalyst preferably comprises at least one "starter" compound $L^1$ which is selected from water, primary $C_1$-$C_5$-alkanols, secondary $C_3$-$C_5$-alkanols, phenol, alkyl-substituted phenol and tertiary alkyl ethers. The starters $L^1$ are typically compounds having an abstractable (acidic or active) hydrogen atom without significant steric hindrance. The compounds $L^1$ are referred to as starters because their active hydrogen atom is incorporated at the start of the growing polyisobutene chain. Suitable starters $L^1$ are also tert-alkyl ethers such as tert-butyl methyl ether which readily form a tert-alkyl cation, or halohydrocarbons such as dichloromethane or trichloromethane. Preferred compounds $L^1$ are primary $C_1$-$C_5$-alkanols and secondary $C_3$-$C_5$-alkanols, for example methanol, ethanol, 2-propanol and/or 1-propanol. Among these, methanol and isopropanol are most preferred. Also preferred as $L^1$ are mixtures of primary $C_1$-$C_5$-alkanols and/or secondary $C_3$-$C_5$-alkanols with a tert-alkyl ether. Tertiary alkyl ethers are dialkyl ether compounds which bear, on the ether oxygen, one or two tertiary alkyl groups, preferably one tertiary alkyl group, having preferably from 4 to 6 carbon atoms, and a further alkyl group having from 1 to 6 carbon atoms. Among these, preference is given in particular to dialkyl ethers, which bear, on the ether oxygen atom, a tert-butyl group or a 2-methylbutan-2-yl group. The other alkyl group on the ether oxygen atom is preferably a primary or secondary alkyl group which generally has from 1 to 6 carbon atoms and in particular from 1 to 3 carbon atoms, for example a methyl, ethyl, n-propyl or isopropyl group and in particular a methyl group. A particularly preferred tert-alkyl ether is tert-butyl methyl ether. The molar ratio of compound $L^1$ to boron trifluoride is typically in the range from 0.5:1 to 3.0:1, in particular in the range from 0.6:1 to 2.5:1 and especially in the range from 0.7:1 to 2.0:1.

In addition to the compound $L^1$, the cocatalysts may also comprise a regulator. The regulators $L^2$ used additionally may be aldehydes and/or ketones which typically comprise from one to 20, preferably from 2 to 10 carbon atoms and in which functional groups other than the carbonyl group are preferably absent. Suitable as $L^2$ are, for example, formaldehyde, acetaldehyde, propionaldehyde, n-butyraldehyde, isobutyraldehyde, acetone, methyl ethyl ketone and diethyl ketone. Acetone is most preferred. The molar ratio of regulator to boron trifluoride is generally in the range from 0:1 to 0.5:1, preferably in the range from 0:1 to 0.3:1. In a preferred embodiment, the cocatalysts comprise no or less than 10 mol %, in particular less than 5 mol %, of compound $L^2$ based on boron trifluoride.

In addition to the compound $L^1$, the cocatalysts may also comprise a substance which promotes the solubility of the boron trifluoride complex catalyst, a so-called solubilizer $L^3$. The solubilizers $L^3$ have a solubilizing action and increase the solubility of the catalyst complex in the starting material. These are tert-alkyl ethers of various ethers having at least 5 carbon atoms or long-chain and/or sterically hindered alcohols which offer screening against the approach of isobutene molecules. Preference is given to using dialkyl ethers having from 5 to 20 carbon atoms, a secondary alkanol having from 6 to 20 carbon atoms, a primary alkanol having from 6 to 20 carbon atoms and/or a tertiary $C_4$-$C_{20}$-alkanol. When solubilizing primary alkanols are used, they preferably have a β-branch, i.e. a branch at the adjacent carbon atom to the carbon atom which bears the hydroxyl group. Suitable representatives are selected, for example, from di-n-butyl ether, di-n-hexyl ether, dioctyl ether, 2-ethylhexanol, 2-propylheptanol, the oxo alcohols of di-, tri- and tetramer propylene and di- and trimer butene, linear 1-alcohols (which are obtainable, for example, by the Alfol® process), provided that they are liquid under reaction conditions, such as n-hexanol or n-octanol, and tert-butanol.

Among these, 2-ethylhexanol is most preferred. The molar ratio of $BF_3$ to the compound $L^3$ is typically in the range from 0:1 to 1.0:1, for example in the region of 0.01:1, frequently in the range from 0.05:1 to 0.5:1, in particular in the range from 0.1:1 to 0.35:1. In a further preferred embodiment, the cocatalysts comprise no or less than 10 mol %, in particular less than 5 mol % of compound $L^3$ based on boron trifluoride.

Preferred complex catalysts can be described by the general formula $$(BF_3)_a(L^1)_b(L^2)_c(L^3)_d$$

in which $L^1$, $L^2$ and $L^3$ are each as defined above and in which
 the b:a ratio is in the range from 0.5 to 3.0, preferably from 0.6 to 2.5 and in particular from 0.7 to 2.0,
 the c:a ratio is in the range from 0 to 0.5, preferably from 0 to 0.3 and in particular <0.1 or <0.05,
 the d:a ratio is in the range from 0 to 1.0, for example from 0.01 to 1.0, preferably from 0.05 to 0.5, in particular from 0.1 to 0.35.

The $BF_3$ concentration in the reactor is generally in the range from 0.005 to 1% by weight based on the liquid reaction phase, in particular in the range from 0.01 to 0.5% by weight and especially in the range from 0.02 to 0.2% by weight.

The boron trifluoride complexes may be preformed in separate reactors before they are used in the process according to the invention, stored intermediately after they have been formed and metered into the polymerization apparatus as required.

Another preferred variant consists in generating the boron trifluoride complexes in situ in the polymerization apparatus or a feed. In this procedure, the particular cocatalyst, if appropriate, is fed into the polymerization apparatus or the feed together with a solvent, and boron trifluoride in the required amount is dispersed in this mixture of the reactants. When this is done, the boron trifluoride and the cocatalyst react to give the boron trifluoride complex. Instead of an additional solvent, it is possible, in the case of in situ generation of the boron trifluoride catalyst complex, for the reaction mixture composed of unconverted isobutene and polyisobutene to function as the solvent. In a further preferred embodiment of the in situ generation, the cocatalyst, for example the compound $L^1$ and, if appropriate, the compounds $L^2$ and $L^3$, are mixed into the reactor feed, i.e. into the liquid reactants (isobutene) or into the mixture of isobutene and diluent, and the required amount of boron trifluoride is added directly into the reactor.

The cyclic ether used is preferably a compound of the formula

in which A is $(CH_2)_n$ where n is 2, 3, 4, 5 or 6, in particular 2, 3 or 4, one $CH_2$ group nonadjacent to the oxygen atom may be replaced by an oxygen atom and where 1 or 2 hydrogen atoms in $(CH_2)_n$ may be replaced by two R radicals which may be the same or different and are selected from $C_1$-$C_6$-alkyl, in particular methyl, or phenyl.

Particular preference is given to using those cyclic ethers which, under the polymerization conditions, oligomerize or polymerize only slowly to the corresponding polyethers.

Examples of suitable cyclic ethers are oxiranes such as ethene oxide, propene oxide, 1-butene oxide, 2-butene oxide, isobutene oxide, diisobutene oxide (epoxide of the isobutene dimer, predominantly the oxirane of 2,4,4-trimethylpentene-1), triisobutene oxide (epoxide of the isobutene trimer, predominantly the oxirane of 2,4,4,6,6-pentamethylheptene-1), styrene oxide, α-methylstyrene oxide, tetrahydrofuran, pyran, 1,3-dioxolane and dioxane, particular preference being given to 1-butene oxide, 2-butene oxide, isobutene oxide, diisobutene oxide, triisobutene oxide and tetrahydrofuran.

It is possible to use one cyclic ether alone or a mixture of two or more.

In general, the cyclic ether is used in an amount of from 1 to 30 mol %, preferably from 2 to 20 mol % and in particular from 5 to 15 mol %, based on $BF_3$.

The cyclic ether can be added to the reaction mixture before or after the catalyst or together with the catalyst, or be fed to the reactor together with the cocatalysts.

The polymerization of isobutene is preferably effected in a continuous process. Measures for continuous polymerization of isobutene in the presence of boron trifluoride-containing catalysts in inert organic solvents to give polyisobutene are known per se. In a continuous process, a portion of the reaction mixture formed in the polymerization reactor is discharged continuously. An amount of starting materials corresponding to the discharge is fed continuously to the polymerization reactor (feed stream) and mixed with the mixture present in the reactor (in a circulation process, the so-called circulation rate or circulation). The ratio of circulation stream to feed stream is generally in the range from 1000:1 to 1:1, preferably in the range from 500:1 to 5:1 and in particular in the range from 20:1 to 100:1 v/v. The mean residence time of the isobutene to be polymerized in the polymerization reactor, which is determined by reaction volume and feed stream, may be from 5 seconds up to several hours. Residence times of from 1 to 30 min, in particular from 2 to 20 min, are preferred.

The polymerization is effected generally at a temperature in the range from −60° C. to +40° C., preferably less than 0° C., more preferably in the range from −5° C. to −40° C. and especially in the range from −10° C. to −30° C. The heat of polymerization is removed appropriately with the aid of a cooling apparatus. This may be operated, for example, with liquid ammonia as a coolant. Another means of removing the heat of polymerization is that of evaporative cooling. In this case, the heat released is removed by evaporation of the isobutene and/or of other volatile constituents of the isobutene feedstock or of any volatile solvent.

The polymerization of isobutene is effected in the reactors customary for continuous polymerization, such as stirred tanks, tubular reactors, tube bundle reactors and loop reactors, preference being given to loop reactors, i.e. tube (bundle) reactors with circulation and turbulent flow, or reactors with internals such as static mixers, i.e. reactors with local stirred tank characteristics with the properties of plug flow. In the case of low-viscosity reaction mixtures, particularly favorable reactors are loop reactors with tube cross sections up to 25 mm, which lead to turbulent flow; in the case of high-viscosity reaction mixtures, larger tube cross sections with static mixing elements and low flow rates are preferred.

In preferred embodiments, the polymerization is carried out in at least two successive reactors, of which at least the first reactor is backmixed to feed introduction.

In the first reactor, the isobutene fed is polymerized generally up to a partial conversion of up to 95%, preferably from 50 to 90%, more preferably from 70 to 90%, based on the isobutene introduced into the first reactor. The effluent from the first reactor is preferably passed without further workup into the second reactor or from a preceding reactor into the next reactor. Here, the further polymerization is effected without addition of fresh isobutene.

In the case of setting of an isobutene conversion of from 50 to 90%, the residence time of the reaction mixture in the first reactor is typically from 5 to 60 minutes, but may also be shorter or longer depending on whether a very active or less active catalyst is used. In the second reactor, a residence time of from 1 to 180 minutes, preferably from 2 to 120 minutes, is generally established. In general, the isobutene conversion in the last reactor is adjusted such that the overall conversion of isobutene is from 90 to 99.5%.

The concentration of isobutene in the liquid reaction phase in the reactor is generally in the range from 0.2 to 50% by weight, preferably in the range from 0.5 to 20% by weight and in particular in the range from 1 to 10% by weight based on the liquid reaction phase. In the case of preparation of polyisobutenes having number-average molecular weights $M_n$ in the range from 500 to 5000, preference is given to working at an isobutene concentration in the range from 1 to 20% by weight and in particular in the range from 1.5 to 10% by weight. In the case of preparation of polyisobutenes having a number-average molecular weight $M_n$ of more than 5000, preference is given to working at an isobutene concentration in the range from 4 to 50% by weight. In preferred embodiments, the isobutene concentration in the first reactor (main reactor) does not go below 3% by weight.

When it leaves the last reactor, the reaction mixture comprises typically 2% by weight or less isobutene. The isobutene concentration preferably does not go below 0.2% by weight and in particular 0.5% by weight, since lower concentrations would favor the incorporation of 1-butene.

In the polymerization process according to the invention, preference is given to working under isothermal conditions at least in the main reactor, i.e. the temperature of the liquid reaction mixture in the polymerization reactor has a steady-state value and changes only to a slight degree, if at all, during the operation of the reactor. If desired, the polymerization in the second reactor can be effected at a lower polymerization temperature than in the first reactor. In that case, further activation by addition of fresh boron trifluoride or of a cocatalyst with activating properties, such as an aldehyde or ketone, for example acetone, or methanol, is generally required. In the case of polymerization in a plurality of reactors, preference is given to operating the second or further reactor at slightly higher temperature in order to complete the isobutene conversion by thermal activation. Since the polymerization proceeds exothermically, it is possible for this purpose to operate the second or further reactor under substantially adiabatic conditions, i.e. the reactor is not actively cooled or heated and the heat of polymerization is absorbed by the reaction mixture. It has been found to be favorable in this context to deactivate a portion of the complex catalyst by addition of nitrogen donors such as nitriles, e.g. acetonitrile, cyanides such as HCN, or by means of proton traps such as pyridines or amines. As a result of this, particularly narrow molecular weight distributions are achieved.

The reaction mixture leaving the polymerization reactor still comprises active catalyst. As a result of this, the polyisobutene formed in the polymerization reactor can change disadvantageously with regard to molecular weight, molecular weight distribution and end group content. In order to prevent further reaction, the polymerization is therefore typically terminated by deactivating the catalyst. The deactivation can be brought about, for example, by addition of water, alcohols, acetonitrile, ammonia or aqueous solutions of mineral bases, or by introducing the effluent into one of the aforementioned media. Preference is given to deactivation with water, which is preferably carried out at temperatures in the range from 1 to 60° C. (water temperature). At lower temperatures, termination by addition of acetonitrile is advisable; the deactivated effluent can appropriately be used to precool the feed, for example in a countercurrent heat exchanger.

The boron trifluoride complex catalysts can also be removed substantially from the effluent and recycled into the polymerization reaction. The removal and recycling of the catalyst from the effluent of the polymerization reaction is known from WO 99/31151, which is incorporated fully by reference. To remove the catalyst from the effluent, preference is given to using limited-solubility boron trifluoride complex catalysts and/or to cooling the reaction mixture to temperatures of, for example, from 5 to 30° C. below reactor temperature, preferably from 10 to 20° C. below reactor temperature. In the case of removal of the catalyst from the reactor effluent, it is advisable to lower the isobutene concentration in the effluent beforehand to values below 2% by weight, preferably 1% by weight and in particular below 0.5% by weight based on the effluent.

The catalyst is obtained in the form of finely divided droplets which generally merge rapidly into a coherent phase. The complex droplets and the coherent phase have a distinctly higher density than the polymer solution. They can therefore generally be removed from the polymer-rich, low-catalyst product phase with the aid of separators or other collecting vessels. The polymer-rich product phase removed is generally homogeneous and comprises only small amounts of soluble catalyst fractions. These are deactivated in the manner described above, preferably with water, acetonitrile or acetonitrile/water mixtures thereof.

The fluorine content of the reaction mixture obtained after polymerization has ended is <30 ppm, preferably <20 ppm and in particular <10 ppm. A specific treatment of the reaction mixture to reduce the fluorine content is therefore generally no longer required. If desired, the reaction mixture or the polymer can be subjected to a treatment with an inorganic adsorbent in order to reduce the fluorine content further. The inorganic adsorbent preferably has a high specific surface area. It generally comprises oxides of Si, Al, Zr and/or Ti; it is preferably selected from alumina, zeolites and combinations thereof, especially those having a high specific surface area. Before the adsorbent treatment, the reaction mixture can be subjected to various other treatments, for example to a scrubbing for catalyst deactivation/removal and/or removal of volatile components.

For the contacting of the reaction mixture with the adsorbent, all conceivable batchwise and continuous processes are suitable. For instance, the polyisobutene can be admixed in portions with the adsorbent, preferably under mechanical motion, and removed after sufficient residence time, for example by filtration, decanting off or another suitable process. Appropriately, the adsorbent is present in a fixed bed which is arranged in an adsorption column through which the reaction effluent is passed. The adsorption column is preferably arranged vertically and is flowed through by the stream in the direction of gravity or preferably against gravity. It is also possible to use a plurality of adsorption columns connected in series.

The treatment with the adsorbent is effected generally at a temperature of from 5 to 100° C., preferably from 40 to 95° C., when the adsorbent or the adsorbent combination comprises at least one zeolite. The treatment is effected preferably at a temperature of from 130 to 240° C., in particular from 150 to 230° C., when the adsorbent or the adsorbent combination does not comprise any zeolite and, for example, alumina is used as the sole adsorbent. The residence time, i.e. the time during which the reaction mixture is in contact with the adsorbent, is preferably from 10 to 100 min.

For workup, the diluent and, if appropriate, the unconverted isobutene are removed from the reaction mixture, generally by distilling off under atmospheric pressure and/or under reduced pressure. The diluent distilled off may be recycled into the polymerization reactor, preferably without further treatment. When the isobutene source used for the process according to the invention is a $C_4$ hydrocarbon stream, the isobutene-depleted stream is preferably not recycled but rather sent to a further use, for example a hydroformylation of the linear butenes present therein to valeraldehyde.

After removal of the diluent, the residue which comprises the desired polyisobutene is typically worked up further. Volatile oligomers of the isobutene are removed by distillation by customary methods together with diluent residues, for example at temperatures up to 230° C. under reduced pressure. Suitable evaporators are circulation evaporators, falling-film evaporators, thin-film evaporators, Sambay evaporators, annular gap evaporators and the like.

The process according to the invention allows the preparation of polyisobutene having a fluorine content which has been considerably reduced in comparison to the preparation without cyclic ethers. In addition, even the fluorine content of the reaction mixture obtained after the polymerization has been greatly reduced. In the workup of the reaction mixture, the risk of formation of hydrogen fluoride and thus also the risk of corrosion is therefore extremely low, so that the use of expensive corrosion-resistant apparatus made of high-nickel stainless steels can be dispensed with. In addition, the polyisobutenes obtained in accordance with the invention have high molecular uniformity and a high content of olefinic end groups. The formation of polymers with hydroxyl groups was not observed.

The invention is illustrated in detail by the examples which follow.

EXAMPLE 1

2 mol of isobutene and 200 ml of hexane were dried over a 3 Å molecular sieve and initially charged in a 1 l polymerization flask with dry ice reflux condenser and magnetic stirrer bar, and cooled to −20° C. with acetone/dry ice while being stirred on a magnetic stirrer. 1.25 mmol of 1-butene oxide and a presynthesized $BF_3$-isopropanol complex composed of 12.5 mmol of $BF_3$ and 17.86 mmol of isopropanol were then added in succession. The temperature of the reaction mixture increased by 5° C. After 15 min, the polymerization was terminated with 300 ml of water and the reaction mixture was introduced into a separating funnel. The aqueous phase was removed and the organic phase was filtered through $Na_2SO_4$. The fluorine content of the organic phase was determined by means of $^{19}F$ NMR spectroscopy. No signals were detectable any more, so that the fluorine content was <1 ppm. After the solvent had been distilled off and degassing at 210° C. (15 min, 2 mbar), a polyisobutene was obtained with a molecular weight $M_n$ of 1300, a polydispersity D of 1.8 and a vinylidene content of 82%.

EXAMPLE 2

The process described in example 1 was repeated, except that, in place of 1-butene oxide, the same amount of isobutene oxide was used. The fluorine content of the organic phase (crude effluent) and of the polyisobutene are specified in the table 1 which follows.

EXAMPLE 3

The process described in example 1 was repeated, except that, in place of 1-butene oxide, the same amount of propene oxide was used. The fluorine content of the organic phase (crude effluent) and of the polyisobutene are specified in the table 1 which follows.

COMPARATIVE EXAMPLE 1

The process described in example 1 was repeated, except without addition of a cyclic ether. The fluorine content of crude effluent and resulting polyisobutene is specified in the table 1 which follows.

EXAMPLE 4

The process described in example 1 was repeated, except that, in place of isobutene/hexane, 400 ml of raffinate I with 45% isobutene were used as the starting material. In order to terminate the polymerization, 300 ml of hexane were added additionally. The fluorine content of the resulting polyisobutene is specified in the table 1 which follows.

EXAMPLE 5

The process described in example 4 was repeated, except that, in place of 1-butene oxide, half the amount of 2-butene oxide was used. The fluorine content of the resulting polyisobutene is specified in the table 1 which follows.

COMPARATIVE EXAMPLE 2

The process described in example 4 was repeated, except without addition of a cyclic ether. The fluorine content of the resulting polyisobutene is specified in the table 1 which follows.

TABLE 1

| Fluorine content of crude effluent and polyisobutene | | |
|---|---|---|
| | Fluorine content (ppm) | |
| | Crude effluent | Polyisobutene |
| Example 1 | <1 | <1 |
| Example 2 | 5 | <1 |
| Example 3 | 6 | <1 |
| Comparative example 1 | 140 | <1 |
| Example 4 | — | 30 |
| Example 5 | — | 19 |
| Comparative example 2 | — | 42 |

What is claimed is:

1. A process for preparing polyisobutene having a number-average molecular weight Mn of from 400 to 50 000 by polymerizing isobutene in the presence of a $BF_3$-containing complex catalyst, comprising boron trifluoride and at least one cocatalyst selected from the group consisting of oxygen-containing compounds with OH groups, acyclic ethers, ketones, aldehydes and anhydrides of carbon acids, wherein the polymerization is carried out at least temporarily in the presence of a cyclic ether.

2. The process according to claim 1, wherein the cyclic ether is selected from the compounds of the formula

in which A is $(CH_2)_n$ where n is 2, 3, 4, 5 or 6, one $CH_2$ group nonadjacent to the oxygen atom may be replaced by an oxygen atom and where 1 or 2 hydrogen atoms in $(CH_2)_n$ may be replaced by two R radicals which may be the same or different and are selected from $C_1$-$C_6$-alkyl or phenyl.

3. The process according to claim 1, wherein the cyclic ether is selected from the group consisting of propene oxide, 1-butene oxide, 2-butene oxide, isobutene oxide, diisobutene oxide, triisobutene oxide and tetrahydrofuran, and mixtures thereof.

4. The process according to claim 1, wherein the cyclic ether is present in an amount of from 1 to 30 mol % based on $BF_3$.

5. The process according to claim 1, wherein the $BF_3$-containing complex catalyst comprises at least one oxygen-containing organic compound.

6. The process according to claim 5, wherein the molar ratio of $BF_3$ to the oxygen-containing compound is in the range from 0.5 to 3.0.

7. The process according to claim 1, wherein the $BF_3$-containing catalyst comprises a primary $C_1$-$C_5$-alkanol or secondary $C_3$-$C_5$-alkanol.

8. The process according to claim 7, wherein the molar ratio of $BF_3$ to alkanol is in the range from 0.5 to 3.0.

9. The process according to claim 5, wherein the $BF_3$-containing catalyst comprises a tertiary alkyl ether.

10. The process according to claim 9, wherein the molar ratio of $BF_3$ to the total amount of tertiary alkyl ether and $C_1$-$C_5$-alkanol is in the range from 0.5 to 3.0.

11. The process according to claim 1, wherein said isobutene is provided as is an isobutenic C4-hydrocarbon stream which comprises from 20 to 50% by weight of isobutene, from 40 to 60% by weight of 1-butene, cis and trans-2-butene, and isobutane and/or n-butane (raffinate I).

12. The process according to claim 6, wherein the $BF_3$-containing catalyst comprises a tertiary alkyl ether.

13. The process according to claim 7, wherein the $BF_3$-containing catalyst further comprises a tertiary alkyl ether.

14. The process according to claim 1, wherein the polyisobutene has a content of methylidene groups of at least 60 mol %.

15. The process according to claim 1, wherein the polyisobutene has a content of methylidene groups of at least 75 mol %.

16. The process according to claim 1, wherein the polyisobutene has a number-average molecular weight of from 600 to 5000.

17. The process according to claim 1, wherein the polyisobutene has a number-average molecular weight of from 700 to 2500.

18. The process according to claim 1, wherein the polyisobutene has a polydispersity D of less than 2.5.

19. The process according to claim 1, wherein the polyisobutene has a polydispersity D of not more than 1.8.

20. The process according to claim 1, wherein the polyisobutene has a content of methylidene groups of at least 75 mol %, a number-average molecular weight of from 700 to 2500, and a polydispersity D of not more than 1.8.

* * * * *